Sept. 5, 1939.  G. AUGUSTIN  2,171,968
PACKING
Filed Nov. 30, 1937
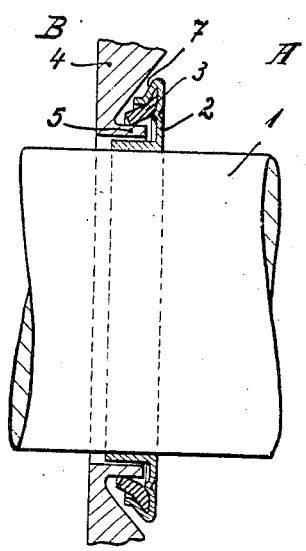
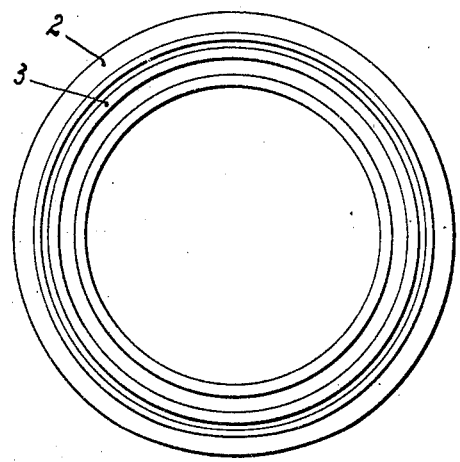
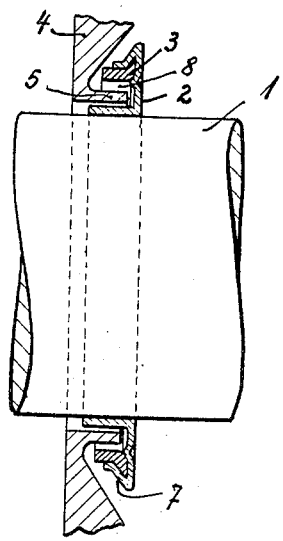
Inventor:
Gustav Augustin Patented Sept. 5, 1939

2,171,968

UNITED STATES PATENT OFFICE 2,171,968

PACKING

Gustav Augustin, Heilbronn-on-the-Neckar, Germany, assignor to Kupfer-Asbest-Co. Gustav Bach, Heilbronn-on-the-Neckar, Germany Application November 30, 1937, Serial No. 177,180
In Germany December 7, 1936

1 Claim. (Cl. 286—7)

My invention relates to packings and more especially to means for packing rotating shafts at the points where they project from the bearings, casings or the like.

It is an object of my invention to provide a shaft packing which is more efficient than similar packings hitherto suggested.

Packings designed to prevent the escape of a liquid or gas through the gap between a rotating shaft and the bearing supporting it consist as a rule of a metal case with a leather or rubber packing ring enclosed therein, which applies itself under pressure against the shaft. These packings involve the drawback that in view of the heat developed by friction between the packing material and the shaft, this material is liable to char or at least to deteriorate to such an extent that the gap between the shaft and the bearing is not properly sealed anymore.

I avoid this drawback, according to the present invention, by providing means whereby any undue generation of heat by friction is avoided from the beginning. To this end I render the pressure, under which the packing ring is forced against the shaft, dependent upon the number of revolutions of the shaft in such manner that this pressure decreases in proportion to a rise of the number of revolutions and vice versa, so that even in the case where the number of revolutions rises considerably, no injurious development of heat can take place.

I fulfill this condition by so arranging the packing ring in a jacket-like casing fixed on the shaft, that the operative portion (sealing edge) of the ring is caused to exert pressure onto an annular sealing surface rigidly connected with the machine bed or with the bearing case. The mass effects arising in consequence of the centrifugal forces generated during rotation of the shaft create tensions in the elastic packing ring, which countract the pressure under which the ring is applied against the shaft or casing, so that this pressure automatically drops in proportion as the number of revolutions rises. This drop of pressure brought about by the action of the centrifugal force may even be such that on a predetermined number of revolutions being overstepped, the ring will be lifted somewhat from the shaft surface. In order that also in this case any escape of liquid is avoided, the casing, in which the elastic packing ring is accommodated, is so designed that it can act as a centrifugal and will fling off any liquid which may approach the packing ring from within.

By thus adapting the force, under which the packing ring is pressed against the casing, to the number of revolutions of the shaft, any injurious heating up of the ring can be avoided with certainty.

In the drawing affixed to this specification and forming part thereof a shaft packing embodying my invention is illustrated diagrammatically by way of example.

In the drawing:

Fig. 1 is an axial section of the packing in the position which it assumes, while the shaft is at rest.

Fig. 2 is a similar view, showing the packing while the shaft rotates at high speed.

Fig. 3 is an elevation of the packing and of the casing surrounding it.

Referring to the drawing, 1 is the shaft and 2 is a metal case or jacket fixed on this shaft. 3 is the packing ring, consisting of elastic material fixed in the casing, its free edge, in the position of rest, applying itself yieldingly against an annular packing surface 5 rigidly fixed to the machine structure 4. Obviously by this arrangement any escape of liquid or the like from the interior A to the outside B is altogether avoided.

The packing ring 3 is mounted in the casing in such position, that under the influence of the centrifugal force, when the shaft rotates, the packing edge 6 tends to be lifted off the packing surface 5. If the number of revolutions oversteps a predetermined maximum, the ring 3 may even be lifted altogether free of the annular packing surface 5, as shown, by way of example, in Fig. 2. In this case the outer edge of the casing 2, being formed similar to the circumference of a centrifugal, causes the liquid approaching the casing to be flung off, so that the liquid is prevented from escaping through the gap 8.

I wish it to be understood that I do not desire to be limited to the exact details of construction shown and described for obvious modifications will occur to a person skilled in the art.

I claim:

A packing for rotary shafts comprising in combination, an annular casing fixed on the shaft, an elastic packing ring having the form of a hollow conical frustum secured to said casing at the larger diameter of said packing ring, a machine structure supporting said shaft and an axially extending packing surface fixed to said machine structure, the inner free edge of the narrower side of said packing ring contacting with said axially extending packing surface so that, on the shaft rotating at high speed the inner edge of the ring is lifted, by centrifugal action, off said packing surface.

GUSTAV AUGUSTIN.